United States Patent
Anderson et al.

[11] Patent Number: 6,166,881
[45] Date of Patent: *Dec. 26, 2000

[54] HEAD CLEANER FOR LINEAR TAPE DRIVE THAT ALSO FUNCTIONS AS A HEAD PROTECTOR DURING CLEANING TAPE OPERATIONS

[75] Inventors: James C. Anderson, Eagle; Darrel R. Bloomquist, Meridian, both of Id.

[73] Assignee: Hewlett-Packard Co., Palo Alto, Calif.

[ * ] Notice: This patent is subject to a terminal disclaimer.

[21] Appl. No.: 09/187,650

[22] Filed: Nov. 6, 1998

Related U.S. Application Data

[63] Continuation-in-part of application No. 09/042,323, Mar. 13, 1998, Pat. No. 5,930,089.

[51] Int. Cl.[7] ...................................................... G11B 5/41
[52] U.S. Cl. ............................................................. 360/128
[58] Field of Search ........................ 360/128; 15/DIG. 12, 15/DIG. 13, DIG. 14

[56] References Cited

U.S. PATENT DOCUMENTS

| | | | |
|---|---|---|---|
| 2,905,767 | 9/1959 | Eckert et al. | 360/128 |
| 3,731,289 | 5/1973 | Bajgert et al. | 340/174.1 R |
| 4,412,263 | 10/1983 | Nelson et al. | 360/128 |
| 5,136,448 | 8/1992 | Kiriyama et al. | 360/128 |
| 5,453,894 | 9/1995 | Kim et al. | 360/128 |
| 5,463,519 | 10/1995 | Dodt et al. | 360/128 |
| 5,515,223 | 5/1996 | Grittmann et al. | 360/128 |
| 5,701,224 | 12/1997 | Sakui | 360/128 |

FOREIGN PATENT DOCUMENTS

| | | | |
|---|---|---|---|
| 0800162A2 | 10/1997 | European Pat. Off. | |
| 53-035517 | 3/1978 | Japan . | |
| 56-93115 | 7/1981 | Japan | 360/128 |
| 58-057619 | 5/1983 | Japan . | |
| 60-093614 | 5/1985 | Japan . | |
| 62-125565 | 6/1987 | Japan | 360/128 |

*Primary Examiner*—Jefferson Evans

[57] ABSTRACT

This invention is a tape drive which includes a transducer head, a tape carrier, and a tape displacement structure. The tape carrier is provided in association with the transducer head, and is configured to support and move a tape along a tape travel path within the tape drive. The tape carrier moves the tape in contact with the transducer head along the tape travel path during at least one of a read operation and a write operation. The tape displacement structure is provided in association with the transducer head, and is configured to engage and bias a received tape from the tape travel path to a retracted tape travel path. The retracted tape travel path is spaced apart from the transducer head. The tape carrier is operative to move the retracted tape across the tape displacement structure, spaced apart from the transducer head. The tape carrier prevents at least one of transducer wear and transducer contamination caused by contact of the tape moving against the transducer head. A method is also provided.

16 Claims, 5 Drawing Sheets

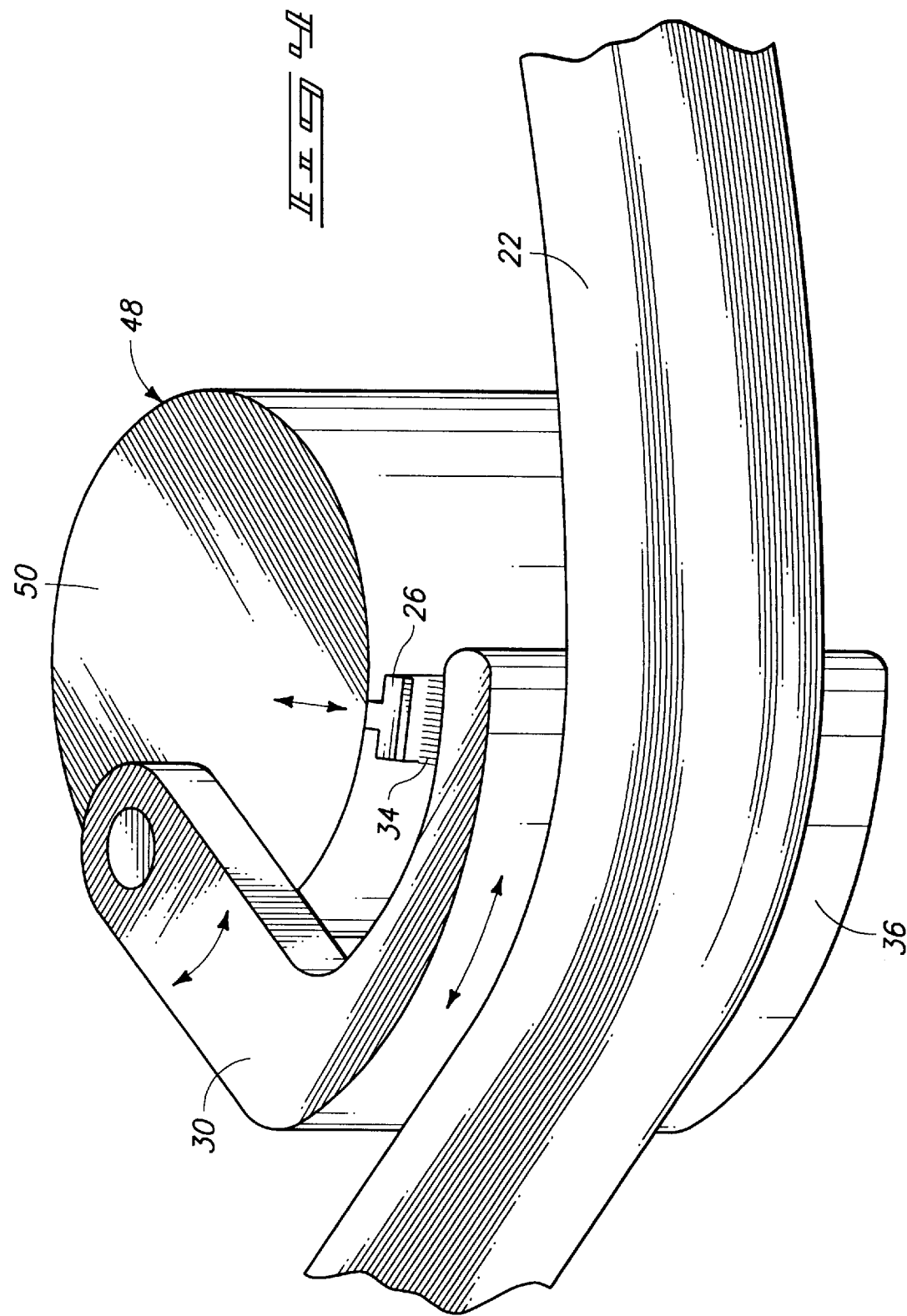

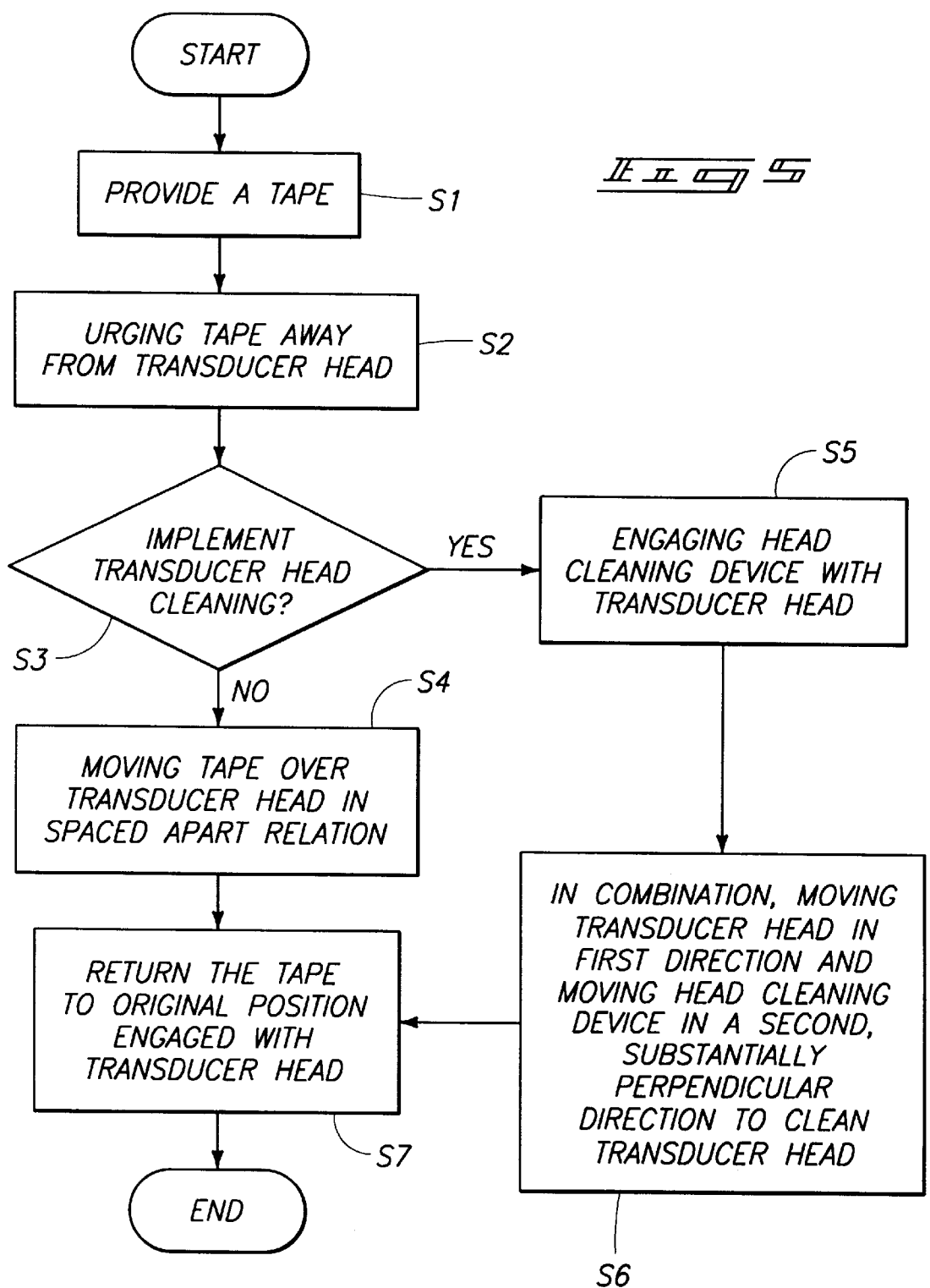

HEAD CLEANER FOR LINEAR TAPE DRIVE THAT ALSO FUNCTIONS AS A HEAD PROTECTOR DURING CLEANING TAPE OPERATIONS

CROSS REFERENCE TO RELATED APPLICATIONS

This application is a continuation-in-part of U.S. patent application Ser. No. 09/042,323, filed Mar. 13, 1998, now U.S. Pat. No. 5,930,089 entitled "Head Cleaner for Linear Tape Drive", herein incorporated by reference.

FIELD OF THE INVENTION

This invention relates generally to tape recording and playback systems for magnetic storage devices, and more particularly to a system which uses a head cleaner for a linear tape drive configurable as a head protector during a cleaning tape operation of a magnetic head or transducer for a recording and playback mechanism.

BACKGROUND OF THE INVENTION

Recording/playback systems for magnetic medium are subject to degradation during use as a result of the accumulation of debris which occurs on the magnetic transducer head(s) of such systems. Transducer heads include magnetic read/write heads and associated read/write elements. Hence, a need exists to periodically clean magnetic transducer head(s). Accordingly, several different techniques have been developed for cleaning a magnetic transducer head as discussed below. However, each technique still has shortcomings that require further improvements.

One prior art technique utilizes a separate, dedicated "cleaning cartridge" to perform periodic cleaning of the recording transducer. A "cleaning cartridge" contains a supply of unrecorded abrasive tape that is used to clean one or more magnetic transducer heads. For example, the recording heads found on a tape drive can be cleaned with a "cleaning cartridge". In order to utilize a "cleaning cartridge", the recording/playback of the medium must be stopped, with the data cartridge being removed, and the cleaning cartridge being inserted. The "cleaning cartridge" is then run within the record/playback system so as to clean the recording transducer. Once cleaning is complete, the "cleaning cartridge" is removed, and a data cartridge is reinserted. However, after the "cleaning cartridge" has been used, a new data cartridge may be loaded into the system in order to evaluate the performance of the magnetic transducer head so as to confirm that cleaning has been successfully completed.

Where the magnetic recording/playback system is a tape recording/playback system, the cleaning cartridge includes an abrasive cleaning tape that can cause excessive tape head wear. The abrasiveness of the cleaning tape can be adjusted in order to tailor its effectiveness. If the cleaning tape is made sufficiently effective to thoroughly remove debris from the read/write heads, then the cleaning tape should only be used when it is necessary; otherwise, excessive head wear will result. Such a problem can occur where a piece of abrasive cleaning tape is provided as a leader on a data tape cartridge such that each time a tape is used the leader is used to clean a read/write head. Furthermore, the provision of an abrasive tape leader within a data tape cartridge eventually results in degradation of the abrasive leader from debris accumulating on the cleaning tape. If the abrasive cleaning tape is made sufficiently effective to thoroughly remove debris from a magnetic head, then a routine must be established to limit use of the cleaning tape only when it is necessary. However, sufficient cleaning may not be realized.

Where magnetic tape is used to store computer data, the presence of errors represents a significant problem even if the errors occur infrequently. In certain applications, the loss of data requires that a user be able to perform a cleaning operation in response to recognized drop-out errors, but does not immediately prevent use of the equipment prior to cleaning. In some cases, the loss of a single bit of computer data can be of significant importance, and recovery from such an error must be done in a manner that ensures error-free data storage and retrieval. While error correction is possible via error correction algorithms, data loss can still present problems to a user.

One form of magnetic storage comprises existing linear and helical scan tape drives that are used for storage and retrieval of computer data. Such tape drives can use a single reel in the form of a magnetic tape cartridge to house the magnetic tape media. A special leader or leader block is attached to the magnetic tape media at one end which enables the tape drive to extract the magnetic tape from the magnetic tape cartridge.

"Tape recorder" is intended to refer to one form of magnetic recording/playback system comprising magnetic tape transcription equipment. Such equipment is understood to include standard tape recorders having fixed or movable heads, as well as arcuate scan and helical scan transcription equipment as is typically used in analog and digital tape recorders. According to one implementation, a linear transcription head is employed, although such invention has application in other tape recording environments. As described here, "transcription" is intended to mean read and/or write operations that are performed with a tape recorder, and is not intended to be limited to a particular use or format for data.

Another prior art technique is found on a typical helical scan tape drive wherein a head cleaning device is built into a mechanism of the tape drive. More particularly, a helical scan tape drive forms a recording method that is used on videotape and digital audio tape (DAT) that runs the tracks diagonally from top to bottom in order to increase the storage capacity. A drum containing read/write heads is used to read/write information in diagonal segments from/onto a segment of magnetic tape. A head cleaner is located on an opposite side of the drum than the tape. In this manner, while data is being written/read, the head cleaner can be concurrently cleaning the heads as they pass by on the drum.

In contrast, a linear tape drive continuously presents a magnetic tape segment in contact with the read/write heads, unless the tape is removed from the tape drive. Hence, linear tape drives typically do not have head cleaners built into the tape drive mechanism. Therefore, a data tape is typically removed when it is determined that the heads have become dirty in order that a cleaning tape cartridge can be loaded into the tape drive to clean debris from the heads. However, such loading/unloading is undesirable because it takes customer intervention and a significant amount of time to spool the tape back into the cartridge. Accordingly, such loading/unloading is slow, cumbersome and is extremely difficult to implement automatically.

One linear tape drive which does have a head cleaner built into the tape drive mechanism is the International Business Machines (IBM) Magstar 3590, sold by IBM Storage Systems Division, 9000 S. Rita Road, Tucson, Ariz. 85744. The IBM Magstar 3590 has a cleaning brush built into the tape drive mechanism such that the cleaning brush is brought into contact with the read/write heads during a tape threading operation. More particularly, as a leader block on a data tape is pulled back into the tape cartridge, the leader block hits a lever which engages the brush against the read/write heads. An actuator moves the heads up and down in order to provide scrubbing action between the brush and heads. However, such cleaning action only takes place after the data tape has been retracted into the data cartridge. Furthermore, it takes time to spool the tape back into the cartridge which causes delay, even before actual brush-to-head cleaning action actually occurs.

It is therefore desirable to employ an improved tape drive cleaning mechanism that is capable of sufficiently cleaning a magnetic head of the system without imparting any significant delay in operation resulting from unwinding a data tape back into a data cartridge before cleaning can begin.

It is further desirable to deliver such cleaning action without having to remove a data tape from a tape drive. Furthermore, there is a desire to deliver cleaning to a head at periodic intervals that substantially coincide with a need to clean debris from a magnetic head.

SUMMARY OF THE INVENTION

The invention provides a device and method for protecting and/or cleaning magnetic heads on a tape drive system. The device comprises a head cleaner for a linear tape drive having a tape displacement structure in the form of a slider surface that retracts a data tape away from a transducer head, enabling accessing and cleaning of the head by a cleaning device.

According to one aspect of the invention, a tape drive includes a transducer head, a tape carrier, and a tape displacement structure. The tape carrier is provided in association with the transducer head, and is configured to support and move a tape along a tape travel path within the tape drive. The tape carrier moves the tape in contact with the transducer head along the tape travel path during at least one of a read operation and a write operation. The tape displacement structure is provided in association with the transducer head, and is configured to engage and bias a received tape from the tape travel path to a retracted tape travel path. The retracted tape travel path is spaced apart from the transducer head. The tape carrier is operative to move the retracted tape across the tape displacement structure, spaced apart from the transducer head. The tape carrier prevents at least one of transducer wear and transducer contamination caused by contact of the tape moving against the transducer head.

According to another aspect of the invention, a self-cleaning linear tape drive includes a magnetic head, a head actuator, a tape carrier and a head cleaning device. The magnetic head is supported within the tape drive to read information from a magnetic tape present within the tape drive. The head actuator is coupled with the magnetic head and is configured to movably position the magnetic head in a direction generally transverse of a tape travel direction. The tape carrier is associated with the magnetic head, and is configured to move the tape along the tape travel path over the magnetic head. The head cleaning device has a tape displacement structure and a movable cleaning apparatus. The tape displacement structure is configured to separate the tape away from the magnetic head. The cleaning apparatus is supported to engage with the magnetic head for movement there against. In operation, the tape is separated from the magnetic head and the cleaning apparatus is engaged with the magnetic head. The cleaning apparatus is moved relative to the magnetic head in a direction generally parallel to the tape travel direction, and the magnetic head is moved by the head actuator in a generally transverse direction while engaged with the cleaning device.

According to yet another aspect of the invention, a method is disclosed for reducing damage to a transducer head of a linear tape drive when using a tape formed at least partially from cleaning tape. The method includes the steps of: providing a tape having at least an abrasive cleaning tape section and a tape carrier for moving the tape within the tape drive, the cleaning tape section supported for movement over the transducer head along a travel path to clean the transducer head; urging the data tape away from the transducer head; and in combination with urging the data tape away from the transducer head, moving the cleaning tape section over the transducer head so as to prevent at least one of: A) abrasive wear against the transducer head; and B) contamination of the transducer head with debris deposited from the cleaning tape.

Objects, features, and advantages are to provide an apparatus and method for protecting a transducer head from wear and/or contamination and for cleaning a transducer head, in a manner that is relatively simple, has fewer parts, and is more effective, economical, durable and rugged.

DESCRIPTION OF THE DRAWINGS

Preferred embodiments of the invention are described below with reference to the following accompanying drawings depicting examples embodying the best mode for practicing the invention.

FIG. 4 is an enlarged and simplified partial perspective view of the cleaning device depicted in FIG. 1 during a cleaning operation.

FIG. 5 is a logic flow diagram illustrating the steps employed in protecting a transducer head from unnecessary abrasive wear/contamination from abrasive cleaning tape and/or cleaning a transducer head.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
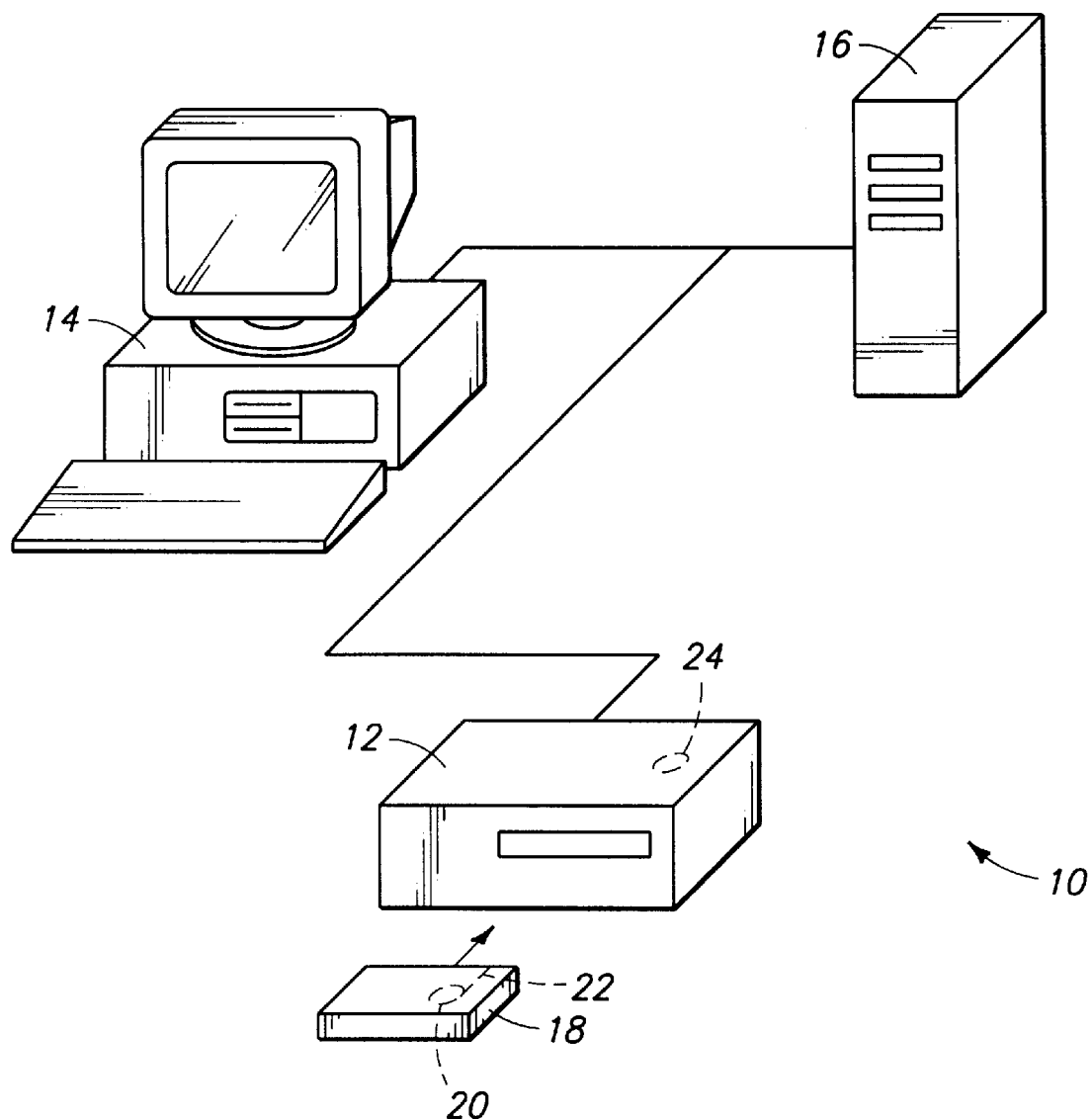
FIG. 1 is a perspective view of a computer system including a linear tape drive data storage device embodying the invention.

FIG. 1 illustrates a computer network environment 10 including a data storage device, or system, 12 embodying this invention, and including a computer 14 and a network server 16. Computer 14 is configured to read data from and write data to data storage device 12. Additionally or optionally, server 16 is configured to read data from and write data to data storage device 12. Computer 14 and network server 16, together or individually, form a host system that is connected with data storage device 12. According to one embodiment, data storage device 12 comprises a data storage/retrieval device configured in the form of a stand-alone computer linear tape drive. According to another embodiment, data storage device 12 is supported in a bay inside a housing of computer 14 or server 16.

As illustrated in FIG. 1, data storage device 12 is a linear recording tape drive. Although the one embodiment illustrated in FIG. 1 is employed in a computer data storing tape drive system, the invention is understood to have a wide variety of applications. For example, certain aspects of the invention can be used in connection with other magnetic storage media, for storing either analog or digital information. Some aspects of the invention can be employed, for example, in connection with any of a variety of types of storage devices having read/write heads, including linear, helical and serpentine tape drives. For purposes of illustration, the invention will be described in connection with a computer linear tape drive.

As shown in FIG. 1, tape drive 12 is configured to be used with tape cartridges such as a data cartridge 18. In the illustrated embodiment, data cartridge 18 is a single-reel type linear tape cartridge. Such tape data cartridge 18 includes a tape carrier in the form of a reel 20, with tape 22 wound onto reel 20. A second reel 24 is included in tape drive 12, and is configured to engage tape 22. Second reel 24 cooperates with first reel 20 to form a tape carrier. According to an alternative construction, data tape cartridge 18 includes two reels. According to one implementation, tape 22 is configured with a width, W, of one-half inch. Such tape 22 has a length extending in a direction perpendicular to width W, with a plurality of parallel tracks being defined across the width of tape 22. Such tracks extend in the direction of the length of tape 22, and are used for storing data as well as storing servo information.

Figure 2:
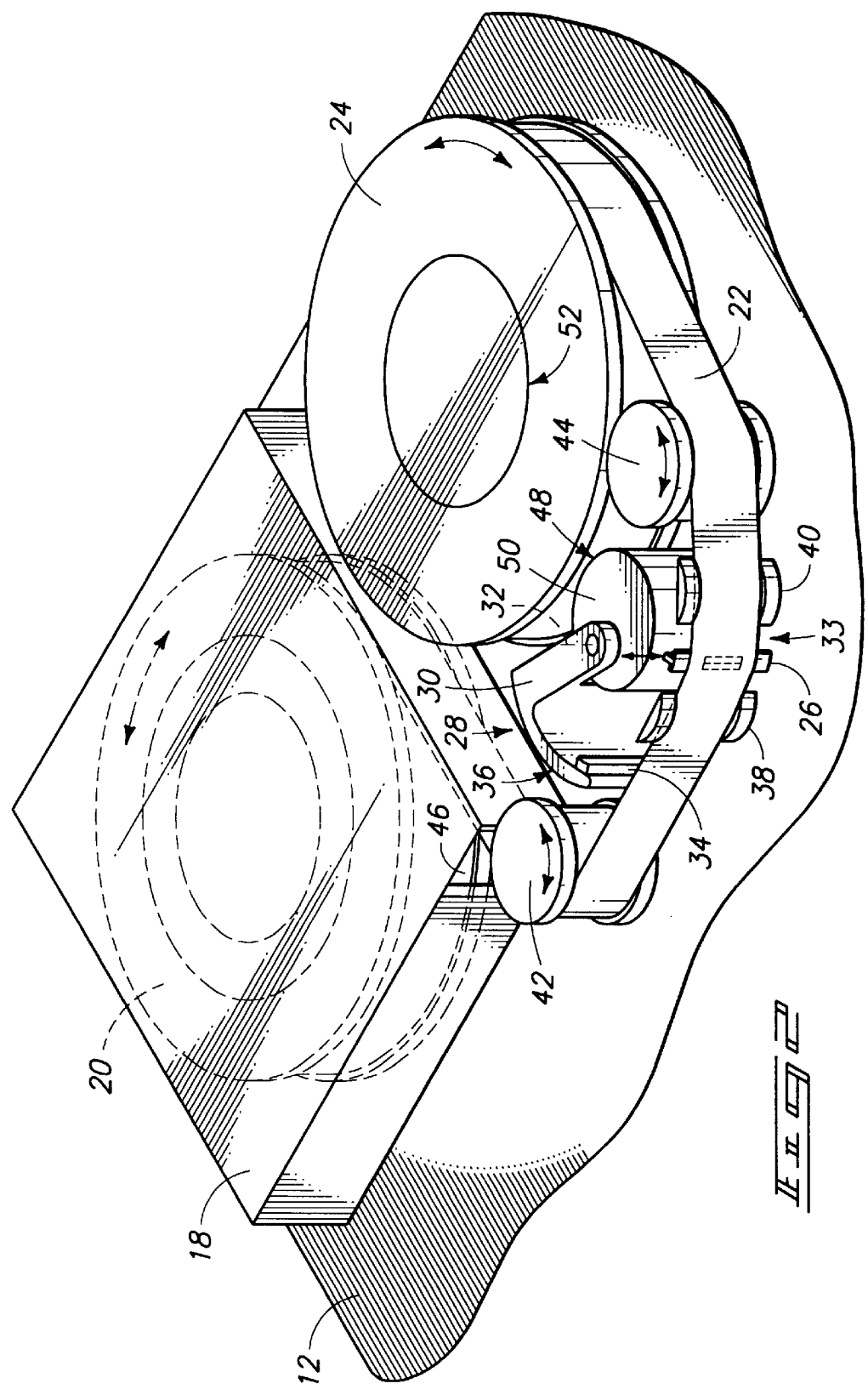
FIG. 2 is a simplified partial perspective view of an inside of a linear tape drive in which a data tape cartridge is received, and showing the cleaning device of this invention provided in association with the tape drive mechanism of the tape drive.

FIG. 2 illustrates the internal operating configuration of tape drive 12 when data cartridge 18 is loaded therein so as to position data tape 22 for linear movement along a magnetic tape head 26. As shown in FIG. 2, computer tape drive 12 includes magnetic tape head 26 which contains a plurality of read/write elements for reading data from or writing data to tape 22 of cartridge 18. Magnetic tape head 26 comprises a transducer head. Additionally, a plurality of servo elements are configured on head 26 for reading servo code from tape 22. Additionally, such servo elements on the tape head are configured for reading servo information as well as data from a portion of tape 22. The performance of individual transducer heads can be tested by writing and reading data from tape 22 in order to verify that head cleaning is required, or that head 26 has been sufficiently cleaned.

FIG. 2 illustrates a head cleaning device 28 configured in one form to include a support structure in the form of a pivotally supported arm 30, carried for movement about a pivot axis 32, and positioned to displace tape 22 from a travel position, or travel path, 33 along head 26. More particularly, arm 30 supports a cleaning apparatus in the form of a cleaning brush 34 along an inner surface at a location wherein pivotal movement of arm 30 positions brush 34 directly against and into engagement with head 26. Optionally, a cleaning pad or surface can be substituted for brush 34. A radial outer slider surface 36 on arm 30 slides and mates with tape 22 so as to displace tape 22 from a natural operating travel position or path 33 against head 26 to a retracted position 35 (see FIG. 3). According to the one construction, support surface 36 forms a cylindrical segment centered about pivot axis 32, as shown in further detail in FIG. 3, configured to slidably engage tape 22.

Arm 30 facilitates retraction of tape 22 from travel position 33 so as to urge tape 22 away from transducer head 26. According to one aspect of Applicant's invention, arm 30 is moved in an oscillating manner such that brush 34 engages transducer head 26 to impart cleaning there along, in combination with transducer head 26 being driven in oscillation in a substantially transverse, or perpendicular, direction. According to another aspect of the invention, arm 30 is pivoted into position so that slider surface 36 biases tape 22 away from travel position 33 such that tape 22 is separated from transducer head 26 while tape 22 is transported between reels 20 and 24. Such second aspect of Applicant's invention enables arm 30 to form a shield that protects transducer head 26 from unnecessary contact with abrasive cleaning media provided on cleaning tape segments of tape 22 when spooling such cleaning tape segments from one reel 22 to another reel 24, and vice versa.

As shown in FIG. 2, tape 22 exits data cartridge 18 along an exit aperture 46 where tape 22 travels around roller guides 42 and 44, as well as stationary guides 38 and 40. Transducer head 26 is positioned between stationary guides 38 and 40 such that tape tension is applied to tape 22 across transducer head 26 during normal operation of tape drive 12.

Figure 3:
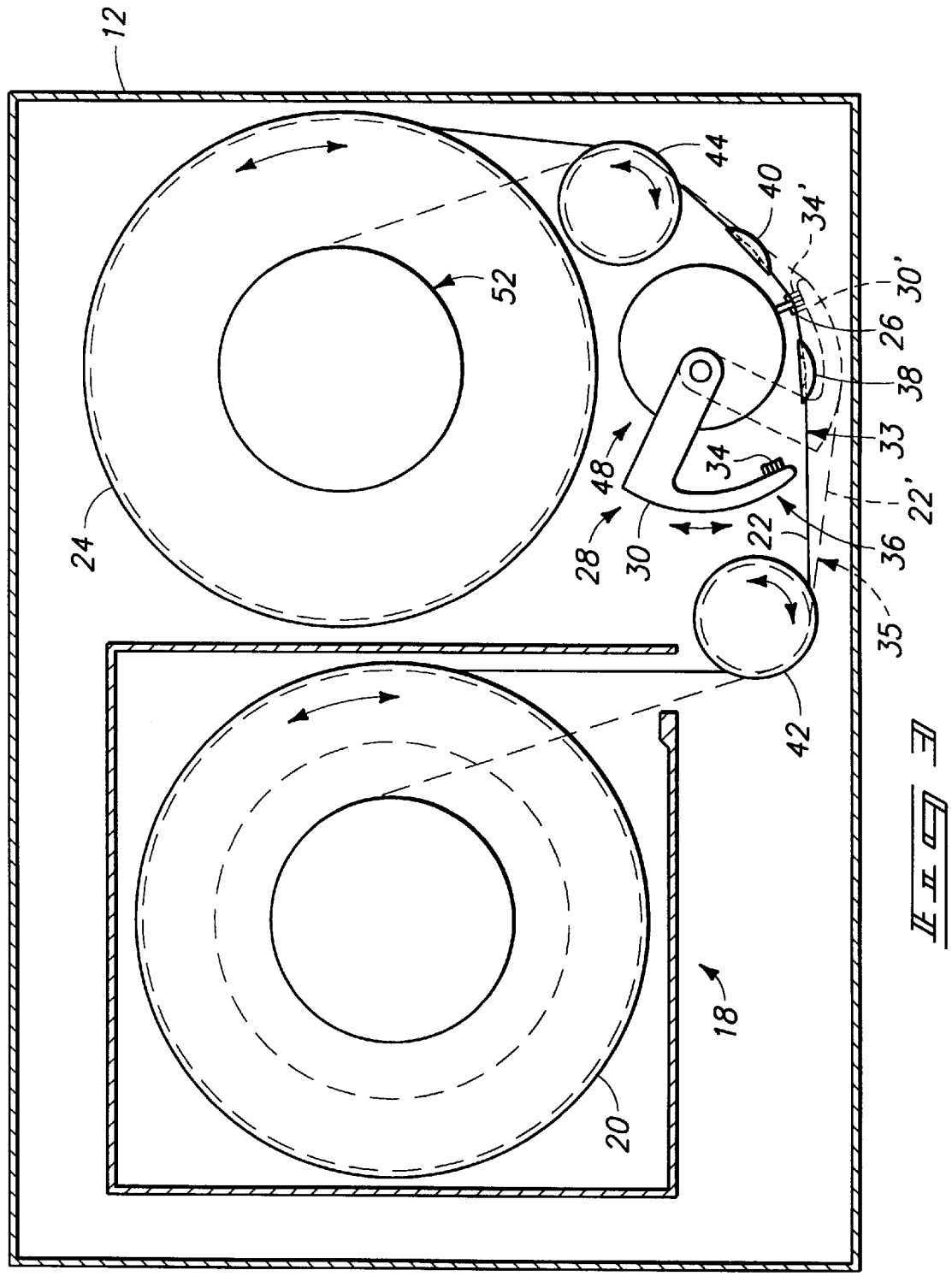
FIG. 3 is a plan view of the tape drive and data cartridge depicted in FIG. 2.

As shown in FIG. 2, head cleaning device 28 is formed from a support arm 30 that is carried for pivotal movement about pivot axis 32 such that tape 22 can be displaced from a travel position 33 to a retracted position 35 (see FIG. 3). Cleaning brush 34 is provided along a radial inner surface of arm 30 at a location such that pivotal movement of arm 30 imparts displacement to tape 22 as radial outer support surface 36 provides a tape displacement structure that biases tape 22 outwardly and away from head 26. Support surface 36 slides behind tape 22, causing tape 22 to be biased apart from transducer head 26. Such biasing enables room for cleaning brush 34 to be brought into contact with head 26 during a cleaning operation as described in further detail below. Accordingly, brush 34 is pivotally positioned by arm 30 for placement directly in contact with head 26. Brush 34 is positioned along head 26 while head 26 is actuated by a motor (not shown) for up-and-down movement, transverse to the travel direction of tape 22, while arm 30 is oscillated in a direction generally parallel to the tape travel path 33. Accordingly, dual cleaning action is imparted between brush 34 and head 26.

It has been discovered that cleaning brush 34 may be ineffective at cleaning transducer head 26 when head 26 is only moved up and down, since bristles on brush 34 can separate down the length of head 26 such that gaps are provided where little or no effective cleaning is imparted therebetween. Such dual cleaning action is provided to more thoroughly ensure cleaning of transducer head 26 in that it has been found that a typical cleaning brush can result in ineffective cleaning with a single-action movement of a transducer head. For example, the bristles of brush 34 can be caused to bias in opposed directions, leaving cleaning gaps along transducer head 26 as such head 26 is moved transversely to travel path 33. The dual cleaning action of Applicant's technique corrects such problem by moving the brush back and forth in a direction perpendicular to the direction of motion of the actuator for head 26. Such dual action causes new bristle ends to be presented constantly to the head surfaces of transducer head 26, thus improving the cleaning action of brush 34. The same holds for other head cleaners such as cleaning pads. More particularly, such motion can be obtained by driving a drive motor (not shown) for arm 30 in an oscillating, forward-then-reverse motion, repeated many times, while a linear actuator 48 moves transducer head 26 up and down.

According to one construction, cleaning brush 34 is formed from a statically dissipative, slightly conductive bristle material. One such bristle material comprises a reasonably conductive, coated and soft nylon brush, or any conductive synthetic fiber. Alternatively, a conductive carbon material can be utilized to form such cleaning brush. Further alternatively, stainless steel can be utilized to form cleaning brush 34. According to one implementation, cleaning brush 34 is oscillated one to ten times per second while engaged with transducer head 26. Likewise, arm 30 is concurrently oscillated 0.1 to two times per second such that brush 34 is agitated against head 26. Such dual action is carried out with sufficient duration to ensure cleaning of head 26.

As shown in FIG. 2, it is understood that head cleaning device 28 is moved into position so as to provide a tape displacement structure that biases tape 22 away from transducer head 26. Additionally, brush 34 is positioned against head 26 to impart cleaning action there along. However, it is also understood that other cleaning devices such as a cleaning pad can be mounted to a tape displacement structure in order to impart cleaning to a transducer head. Furthermore, it is understood that a tape displacement structure can be provided for biasing the tape away from the transducer head, while a separate cleaning device is brought into contact with the head for imparting cleaning action there along. Irrespective of the structural implementation, a first important concept related to this invention is directed to the movement of tape 22 away from head 26 while cleaning is imparted to head 26 by a cleaning structure such as head cleaning device 28, while tape 22 remains loaded into tape drive 12. Hence, there is no need to unload tape 22 and data cartridge 18 from tape drive 12 during a cleaning operation.

According to FIG. 2, magnetic tape head 26 is shown supported for up-and-down movement by a linear actuator 48. Actuator 48 is shown in simplified form as a cylindrical body in FIG. 2, with an actuator housing 50 providing a pivotal support structure for arm 30. It is understood that actuator 48 can be formed from any of a number of constructions presently understood in the art, wherein a linear-magnet displacement member, or any linear displacement member, enables movement of head 26 transverse to the travel direction of tape 22 such that read/write head sensing elements on head 26 can be properly positioned onto tracks of information contained on tape 22. Actuator 48 is also implemented to position read/write head elements of head 26 along tape 22 during normal tape drive operation.

According to the implementation depicted in FIG. 2, actuator 48 is used to impart up-and-down movement of head 26 while it is engaged with brush 34 so as to provide scrubbing action therebetween. Such scrubbing, or cleaning, action can be imparted without spooling the tape back into cartridge 18, so it is much faster than prior art methods described previously.

A second important concept related to Applicant's invention is directed to the movement of head cleaning device 28 to function as a tape displacement structure that biases tape 22 away from transducer head 26. Such biasing prevents unnecessary wear caused by contact of abrasive cleaning tape segments, on tape 22, with transducer head 26. According to this second important concept, slider surface 36 forms a tape displacement structure that is provided in association with transducer head, or tape head, 26 to engage and bias a received tape 22 from tape travel path 33 to retracted path 35. Retracted path 35 is spaced apart from transducer head 26. A tape carrier, provided by reels 20 and 24, is operative to move the retracted tape 22 across tape displacement structure 36 while such tape is spaced apart from head 26. Such spaced-apart separation prevents transducer wear and/or transducer contamination which might otherwise result from contact of tape 22 moving against head 26.

For such second aspect of Applicant's invention, most tape drives 12 have cleaning cartridges containing special abrasive media that is used to clean the tape head and tape guides of the tape mechanism. Typically, such cleaning media is slightly abrasive in order to provide necessary cleaning characteristics. For the case of products that have a pair of reels built into a cartridge, such cleaning media is only used once in order to prevent contamination from used media getting onto a transducer head. This can be realized by preventing the media to be rewound completely back onto a first reel. By rewinding such media back onto a first reel, such media is passed over the head which results in abrasive wear and/or contamination from the used media containing undesirable contaminants thereon.

For the case of a single-reel cartridge, such implementation is not possible since the only way that cleaning media can be accessed is to spool such media through the head mechanisms and over the transducer head (such as transducer head 26 of FIG. 2). However, one potential problem results in that used cleaning media can contaminate head 26. Another problem results in that spooling of cleaning tape, containing cleaning media, from one reel 20 to another reel 24 (of FIG. 2) has the potential to cause excessive wear to head 26 due to the abrasive nature of such media.

Accordingly, the other aspect of Applicant's invention is to provide a protective shield on a head cleaning brush assembly, such as slider surface 36 on head cleaning device 28. One possible configuration is depicted in FIGS. 2–4. Accordingly, head cleaning device 28 comprises a head cleaning brush 34 that provides a shield via slider surface 36. Slider surface 36 can be positioned to bias tape 22 away from head 26 while spooling such tape 22 between reels 20 and 24. Accordingly, such biasing is preferably imparted when a cleaning tape segment is being passed over head 26, but not during a cleaning operation. Accordingly, a reduction can be made in the amount of wear that is imparted between a cleaning tape segment of tape 22 and head 26. Hence, tape 22 is only presented in contact with head 26 when it is desirable to pass a segment of cleaning tape against head 26 during a cleaning operation. Accordingly, contaminated cleaning tape sections are prevented from contacting head 26 by carefully monitoring usage of such cleaning tape section. A contaminated section of cleaning tape is then prevented from contacting head 26 via rotatable positioning of arm 30 and slider surface 36 so as to bias tape 22 away from head 26.

By pushing tape 22 away from head 26, access is also provided for cleaning magnetic tape head 26 via brush 34. Accordingly, the second aspect of Applicant's invention is also provided therein. By engaging a head-cleaning arm comprising a cleaning device 28 in communication with head 26, cleaning media of tape 22 can be spooled from one reel 20 to another reel 24 and vice versa without contacting head 26. Such action eliminates any unnecessary damage or contamination that the cleaning media of tape 22 could otherwise cause to head 26.

Although head cleaning device 28 is shown configured with an integrally formed slider surface 36 and a brush 34, it is to be understood that other types of linkages can be used to move tape 22 away from head 26. For example, a four-bar kinematic linkage, or a slider cam mechanism, can be used to impart retracted motion of tape 22 from head 26.

In order to retract or bias tape 22 and position brush 34 for cleaning action against head 26, arm 30 is powered for pivotal movement between the retracted position for arm 30 (shown in FIG. 3), and a tape-biasing position illustrated as arm 30' (in FIG. 3). One technique to power arm 30 for pivotal movement is to drive arm 30 with an existing motor that is provided within tape drive 12. For example, a tape cartridge load motor can be used to drive a cam that engages a cleaning arm after tape cartridge 18 is loaded into tape drive 12, and further imparts desired oscillating motion between brush 34 and head 26. Alternatively, other separate or dedicated motors can be utilized to pivotally move arm 30 between arm positions 30 and 30', as shown in FIG. 3.

It is understood that the novelty of this invention lies in having a device capable of moving tape 22 away from head 26 to reduce head wear and contamination during tape spooling operations. A further novel aspect lies in enabling cleaning of head 26 while tape 22 is moved away from head 26 without requiring the unloading of tape 22 from tape drive 12, or retraction of tape 22 into tape cartridge 18. Accordingly, cleaning can be imparted to head 26 without having to spool a tape back into its cartridge.

As shown in FIG. 3, tape 22 is supported by a tape carrier comprising reel 20 and reel 24, extending between data cartridge 18 and the support structure mechanisms of tape drive 12. Furthermore, roller guides 42, 44 and stationary guides 38, 40 cooperate to deliver tape 22 along a travel position 33 situated directly against tape head 26. Alternatively, any comparable tape travel path can be provided. Pivotal movement of arm 30 causes slider surface 36 to bias tape 22 into a retracted position 35 illustrated by tape 22'. The pivotal positioning of arm 30 into the positioning of arm 30' retracts tape 22 from head 26 such that brush 34' is placed into direct contact with head 26 where cleaning action can be imparted by reciprocating, or moving, head 26 up and down via operation of actuator 48 and reciprocating of arm 30'. As shown in FIG. 3, actuator 48 is illustrated in one construction as a linear actuator. However, it is understood that any commercially available construction of a linear actuator for moving a head can be used in the alternative.

As shown in FIG. 3, it is understood that tape 22 includes leaders (not shown) and a leader block assembly 52 which enables loading and unloading of tape 22 during loading and unloading of data cartridge 18 within tape drive 12. Details of many different types of leader block assemblies are well understood in the art and are not disclosed herein in any further detail as they do not relate to the novel aspects of this invention. One such leader block assembly is disclosed in U.S. patent application Ser. No. 09/010,418, filed on Jan. 21, 1998, and entitled "Tape Block and Take-up Reel Assembly for a Magnetic Tape Transport System". This U.S. patent application Ser. No. 09/010,418 is herein incorporated by reference. It is understood that any one of a number of commercially available leader block assemblies can be used with a tape drive implementing the features of this invention.

FIG. 4 illustrates in greater detail the positioning of arm 30 such that slider surface 36 biases tape 22 in spaced-apart relation from transducer head 26. According to one aspect of Applicant's invention, a tape carrier (not shown) is provided in association with the transducer head, and is configured to support and move tape 22 along a tape travel path within the tape drive. The tape carrier moves tape 22 in sliding contact with transducer head 26, under normal operation. Such movement occurs during read operations and write operations. However, slider surface 36 acts as a tape displacement structure that biases tape 22 away from head 26 so as to prevent unnecessary wear and/or contamination to reading/writing elements present on head 26. Additionally, the rotatable position of arm 30 and slider surface 36 results in biasing of tape 22 that enables cleaning action between cleaning brush 34 and transducer head 26.

According to the one implementation of Applicant's invention, oscillating or reciprocating motion is imparted to arm 30 by a drive motor (not shown). As shown in FIG. 4, arm 30 is carried for pivotal movement by an actuator housing 50. However, it is understood that arm 30 can be carried for movement by any of a number of kinematic linkages sufficient to move slider surface 30 into engagement with tape 22 so as to bias tape 22 away from transducer head 26. For example, where space is limited, an upper and a lower guide track can be used to guide and position a slider surface on a track-guided support member, or arm, to engage and bias a tape away from a transducer head. Similarly, a head cleaning device discussed below can also be track supported. Such a track construction is presently used to guide leader blocks within tape drive systems.

As shown in FIG. 4, a cleaning device is provided by brush 34 which is configured to engage transducer head 26 for cleaning when tape 22 is biased from transducer head 26 along a retracted tape travel path. The cleaning device provided by brush 34 and the transducer head 26 cooperate to enable cleaning of transducer head 26 without removal of tape 22 from a data storage device.

As shown in FIG. 4, actuator 48 is configured to support transducer head 26 for movement generally transverse to a tape travel path of tape 22 when the cleaning device of brush 34 is engaged with transducer head 26. As further shown in FIG. 4, slider surface 36 forms a tape displacement structure via support arm 30 that is pivotally carried by a tape drive. Such tape displacement structure has a radial outer support surface provided by slider surface 36 that is configured to mate with and to bias tape 22 away from transducer head 26.

As shown in FIG. 4, a cleaning brush 34 is provided along a radial inner portion of arm 30. At least one of the cleaning brush 34 and transducer head 26 is supported for movement relative to the other. Cleaning brush 34 is configured to clean transducer head 26 during such relative movement.

In operation, slider surface 36 provides a support surface on arm 30 that is configured to displace tape 22 so as to separate tape 22 from transducer head 26, and enable brush 34 to engage head 26. According to one implementation, transducer head 26 comprises a magnetic read/write head.

FIG. 5 depicts a method for implementing Applicant's inventive features through use of the structure depicted in FIGS. 1–4. Such inventive features can be implemented via a smart cleaning/head protection system and method that are implemented by way of a controller and memory contained within a tape drive system, such as data storage system 12 (of FIGS. 1 and 2).

According to the logic flow diagram of FIG. 5, a "cleaning/transducer head protection algorithm" is disclosed as a first level logic flow diagram for the programming of a processor, or controller, of a tape drive. The "algorithm" is used to implement protection of a transducer head within a tape drive so as to limit unnecessary abrasive wear against such transducer head when spooling tape having abrasive cleaning tape segments. Furthermore, such algorithm is further used to implement cleaning of a head by biasing a tape away from such head and engaging a cleaning device with the transducer head. In combination, the transducer head and cleaning device are moved in different directions so as to more thoroughly clean the transducer head.

The logic flow diagram of FIG. 5 is initiated, followed by Step "S1". According to Step "S1", a tape is provided. After performing Step "S1", the process proceeds to Step "S2".

In Step "S2", the logic flow diagram initiates urging of the tape away from the transducer head by moving the actuator arm so as to engage the slider surface against such tape. After performing Step "S2", the process proceeds to Step "S3".

In Step "S3", a tape drive processor (or optionally, an associated computer or user) determines whether a transducer head requires cleaning. If the transducer head does not require cleaning and abrasive tape segments are being spooled by such transducer head, the process proceeds to Step "S4". If the transducer head requires cleaning, the process proceeds to Step "S5".

In Step "S4", a tape drive processor directs movement of a tape over a transducer head in spaced-apart relation from such head, by action of a slider surface displacing such tape away from such head. After performing Step "S4", the process proceeds to Step "S7".

In Step "S5", a tape head processor engages the head cleaning device with a transducer head. After performing Step "S5", the process proceeds to Step "S6".

In Step "S6", the tape drive processor, in combination, directs movement of the transducer head in a first direction concurrently with movement of a head cleaning device in a second, substantially perpendicular direction in order to clean the transducer head. Once a predetermined amount of cleaning has been imparted to such head, to a level that is determined to be sufficient to clean such head, the process proceeds to Step "S7".

In Step "S7", the tape drive processor directs return of the urged tape to the original position engaged with the transducer head. After performing Step "S7", the process terminates.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A tape drive, comprising:
    a transducer head;
    a tape carrier operative to move a tape along a tape travel path in contact with the transducer head during at least one of a read operation and a write operation;
    a tape displacement structure configured to engage and bias a tape from the tape travel path to a retracted tape travel path spaced apart from the transducer head;
    a cleaning device configured to engage the transducer head for cleaning while the tape is biased to the retraced tape travel path; and
    an actuator configured to move the transducer head relative to the tape when the cleaning device is engaged with the transducer head to clean the transducer head.

2. The tape drive of claim 1 wherein the tape carrier comprises at least one tape reel rotatably supported within the tape drive to move a received tape past the transducer head.

3. The tape drive of claim 2 further comprising at least one tape guide positioned to present a tape for movement along the tape travel path and against the transducer head during at least one of read/write operations.

4. The tape drive of claim 1 wherein the tape displacement structure comprises a support surface provided on a support arm configured to displace a tape so as to separate the tape from the transducer head and enable the cleaning device to engage the transducer head.

5. The tape drive of claim 1 wherein the transducer head comprises a magnetic read/write head.

6. A self-cleaning linear tape drive, comprising:
    a magnetic head supported within the tape drive to read information from a magnetic tape present within the tape drive;
    a head actuator coupled with the magnetic head and configured to moveably position the magnetic head in a direction generally transverse of a tape travel direction;
    a tape carrier associated with the magnetic head and configured to move the tape along a tape travel path over the magnetic head; and
    a head cleaning device having a tape displacement structure and a moveable cleaning apparatus, the tape displacement structure configured to separate the tape away from the magnetic head, and the cleaning apparatus supported to engage with the magnetic head for movement there against;
    wherein the tape is separated from the magnetic head and the cleaning apparatus is engaged with the magnetic head, the cleaning apparatus being moved relative to the magnetic head in a direction generally parallel to the tape travel direction and the magnetic head being moved by the head actuator in a generally transverse direction while engaged with the cleaning device.

7. The tape drive of claim 6 wherein the tape carrier comprises at least one tape reel configured for storing a tape that is moved over the magnetic head.

8. The tape drive of claim 6 wherein the tape displacement structure includes a support arm having a support surface configured to displace the tape from the magnetic head and enable the head cleaning device to engage the magnetic head while relative movement is imparted between the magnetic head and the head cleaning device to facilitate cleaning of the magnetic head.

9. The tape drive of claim 6 further comprising a pair of guides configured to deliver the tape for engagement with the magnetic head extending along a tape travel path.

10. The tape drive of claim 6 wherein the cleaning apparatus comprises a brush.

11. The tape drive of claim 6 wherein the movable cleaning apparatus comprises a support arm and a brush carried by the arm.

12. A method for reducing damage to a transducer head of a linear tape drive when using a tape formed at least partially from cleaning tape, comprising the steps of:
    providing a tape having at least an abrasive cleaning tape section and a tape carrier for moving the tape within the tape drive, the cleaning tape section supported for movement over the transducer head along a travel path to clean the transducer head;
    urging the tape away from the transducer head by pivoting a tape displacement structure into engagement with the tape to retract the tape such that a cleaning device can engage the transducer head; and
    in combination with urging the tape away from the transducer head, moving the cleaning tape section over the transducer head so as to prevent at least one of:
    A) abrasive wear against the transducer head; and
    B) contamination of the transducer head with debris deposited from the cleaning tape.

13. The method in accordance with claim 12 further including the step of engaging a head cleaning device with the transducer head.

14. The method in accordance with claim 13 further including the step of moving at least one of the cleaning device and the transducer head to impart cleaning to the transducer head.

15. The method in accordance with claim 12 wherein the step of moving the cleaning tape section over the transducer head comprises sliding the tape and cleaning tape section over a slider surface provided to urge the tape away from the transducer head.

16. A tape drive, comprising:

a transducer head;

a tape carrier provided in association with the transducer head and configured to support and move a tape along a tape travel path, the tape carrier moving the tape in contact with the transducer head along the tape travel path during at least one of a read operation and a write operation; and a movable tape displacement structure including a support structure having an outer support surface configured to mate with and bias a tape from the tape travel path to a retracted tape travel path spaced apart from the transducer head, and further including a cleaning brush provided along an adjacent portion of the support structure configured to clean the transducer head during movement of the tape displacement structure;

wherein the tape carrier is operative to move the retracted tape across the tape displacement structure, spaced apart from the transducer head, to prevent at least one of transducer wear and transducer contamination caused by contact of the tape moving against the transducer head.

\* \* \* \* \*